(12) United States Patent
Gilgen et al.

(10) Patent No.: US 6,519,605 B1
(45) Date of Patent: Feb. 11, 2003

(54) RUN-TIME TRANSLATION OF LEGACY EMULATOR HIGH LEVEL LANGUAGE APPLICATION PROGRAMMING INTERFACE (EHLLAPI) CALLS TO OBJECT-BASED CALLS

(75) Inventors: David Blair Gilgen, Raleigh, NC (US); Gregory Thomas Knowles, Raleigh, NC (US); Scott Matthew Quint, Raleigh, NC (US); Brian Thomas Webb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,044

(22) Filed: Apr. 27, 1999

(51) Int. Cl.[7] .............................................. G06F 17/00
(52) U.S. Cl. .................... 707/103 R; 709/300; 709/102
(58) Field of Search ............. 707/1–206; 709/300–331; 345/771–810

(56) References Cited

U.S. PATENT DOCUMENTS 6,381,654 B1 * 4/2002 Brawn et al. ................ 709/331
6,384,850 B1 * 5/2002 McNally et al. ............ 345/810
6,396,517 B1 * 5/2002 Beck et al. .................. 345/771

OTHER PUBLICATIONS

Arlat et al., "Dependability of COTS microkernel–based systems", Computers IEEE Transactions on, vol. 51, Issue 2, Feb. 2002, pp. 138–143.*
Paffenroth et al., "DataViewer: A scene graph based visualization tool", Eurographics UK Conference, 2002, Proceedings The 20th, 2002, pp. 147–148.*
Kim et al., GUI approach to programming of TMO frames, Object–Oriented Real–Time Dpendable Systems, 2002 (WORDS 2002), Proceedings of the Seventh International Workshop on, 2002, pp. 19–26.*

* cited by examiner

*Primary Examiner*—David Jung
(74) *Attorney, Agent, or Firm*—Jeanine S. Ray-Yarletts; Marcia L. Doubet

(57) ABSTRACT

A technique, system, and computer program for run-time translation of procedurally-oriented Emulator High Level Language Application Programming Interface (EHLLAPI) calls into object-based host access calls (such as those provided with IBM's Host Access Control Library or the Open Host Interface Objects under development by the IETF), without requiring changes to the workstation EHLLAPI applications. This translation, in addition to generating the appropriate method invocation, reconciles the operational differences between EHLLAPI's sequential function call model and the event-driven approach used in the object-oriented model.

18 Claims, 9 Drawing Sheets

470 ps.SendKeys("ABC[enter]"); //send some key strokes

FIG. 4
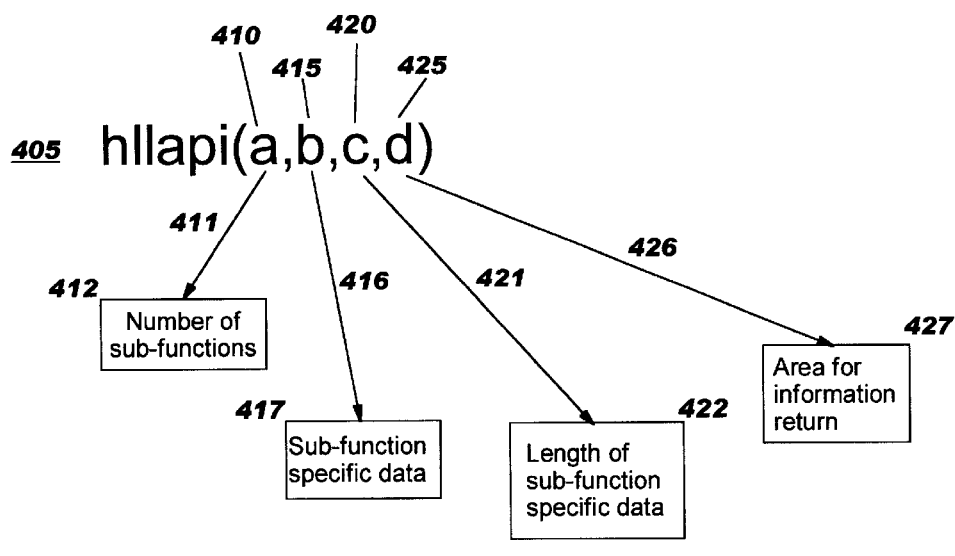
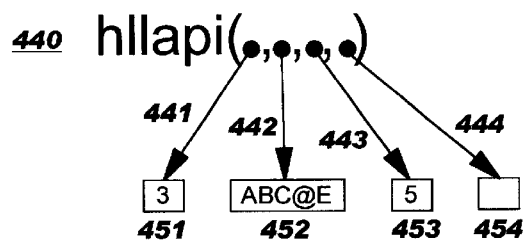
470  ps.SendKeys ("ABC[enter]");  //send some key strokes

FIG. 6
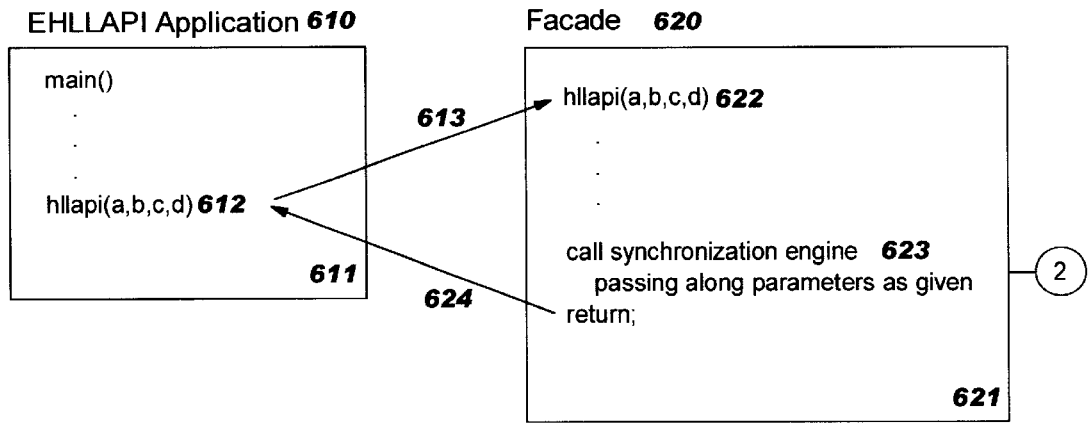
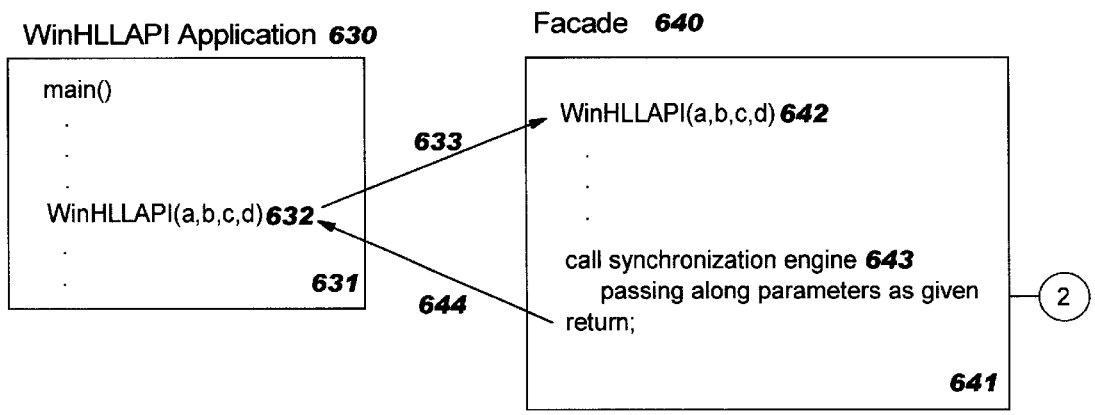

FIG. 9

| Fn. # 910 | Function Name 920 | Notes 930 |
|---|---|---|
| 1 | Connect Presentation Space | |
| 2 | Disconnect Presentation Space | |
| 3 | Send Key | |
| 4 | Wait | |
| 5 | Copy Presentation Space | |
| 6 | Search Presentation Space | |
| 7 | Query Cursor Location | |
| 8 | Copy Presentation Space to String | |
| 9 | Set Session Parameters | |
| 10 | Query Sessions | |
| 11 | Reserve | * 940 |
| 12 | Release | * |
| 13 | Copy OIA | |
| 14 | Query Field Attribute | |
| 15 | Copy String to Presentation Space | |
| 17 | Storage Manager | |
| 18 | Pause | |
| 20 | Query System | |
| 21 | Reset System | |
| 22 | Query Session Status | |
| 23 | Start Host Notification | |
| 24 | Query Host Update | |
| 25 | Stop Host Notification | |
| 30 | Search Field | |
| 31 | Find Field Position | |
| 32 | Find Field Length | |
| 33 | Copy String to Field | |
| 34 | Copy Field to String | |
| 40 | Set Cursor | |
| 41 | Start Close Intercept | * |
| 42 | Query Close Intercept | * |
| 43 | Stop Close Intercept | * |
| 50 | Start Keystroke Intercept | * |
| 51 | Get Key | * |
| 52 | Post Intercept Status | * |
| 53 | Stop Keystroke Intercept | * |
| 60 | Lock Presentation Space API | |
| 61 | Lock Window Services API | |
| 90 | Send File | |
| 91 | Receive File | |
| 99 | Convert Position | |
| 101 | Connect Window Services | |
| 102 | Disconnect Window Services | |
| 103 | Query Window Coordinates | * |
| 104 | Window Status | * |
| 105 | Change Switch List LT Name | * |
| 106 | Change PS Window Name | * |
| 110 | Start Playing Macro | |
| 120 | Connect for Structured Fields | |
| 121 | Disconnect from Structured Fields | |
| 122 | Query Communications Buffer Size | |
| 123 | Allocate Communications Buffer | |
| 124 | Free Communications Buffer | |
| 125 | Get Request Completion | |
| 126 | Read Structured Fields | |
| 127 | Write Structured Fields | |

RUN-TIME TRANSLATION OF LEGACY EMULATOR HIGH LEVEL LANGUAGE APPLICATION PROGRAMMING INTERFACE (EHLLAPI) CALLS TO OBJECT-BASED CALLS

BACKGROUND OF THE INVENTION

1. Field of the Invention

The present invention relates to a computer system, and deals more particularly with a method, system, and computer-readable code for run-time translation of legacy Emulator High Level Language Application Programming Interface (EHLLAPI) calls into object-based calls. Using the present invention, there is no need to rewrite or restructure existing application code which invokes procedurally-oriented EHLLAPI calls to access a host presentation space. Instead, the calls are translated automatically into calls that use an object-oriented host access interface.

2. Description of the Related Art

One of the challenges facing information services ("IS") professionals today is the difficulty of bridging legacy mainframe host data to modern user interfaces. Most legacy host applications present their data in text-based user interfaces designed for use on specific, obsolete character-based terminals. The legacy applications were written with this character-based terminal presentation space as the only interface format in which the host data output is created, and in which host data input is expected. "Presentation space" is a term used abstractly to refer to the collection of information that together comprises the information to be displayed on a screen, as well as the control data that conveys how and where that information is to represented. This collection of information is stored in an area of computer storage and/or memory.

A typical character-based terminal is the IBM Model 3270. (IBM is a registered trademark of the International Business Machines Corporation.) This terminal model was designed to display information in a matrix of characters, where the matrix consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" consists of a limited number of presentation attributes such as what color (typically either green or white) to use when displaying that text. While the Model 3270 is a specific type of IBM display hardware, data formatted for any display having similar characteristics became a de facto standard format referred to as a "3270 data stream". Similarly, the IBM Model 5250 is another type of character-based terminal. This terminal displays data in a slightly different manner from the IBM 3270, and consequently uses a different data stream format. The "5250 data stream" also became a de facto standard format for displays having similar characteristics. A third type of data stream format commonly used by legacy host applications is referred to simply as an "ASCII data stream". While an ASCII data stream is not formatted for a specific model of display screen, a data stream in this format has certain predefined characteristics (for example, the manner in which a control character indicates the line spacing to be used).

The displays used with modern computer workstations (including personal computers, network computers, etc.) support graphics and video, in addition to text characters. These displays do not use a character-based row and column matrix approach to screen layout. Instead, the programmer has access to thousands of tiny display elements, allowing the various types of information to be placed virtually anywhere on the display screen.

When the modem computer workstation is used to access a legacy host application running on a mainframe, the output data created by that host application is often still formatted as one of the character-based data streams. The workstation (whether it is a personal computer, network computer, or other type of computer) has access to the host application and the presentation space it uses through mainframe emulator software. An example of mainframe emulator software is the Personal Communications product from IBM. Emulator software runs on the workstation. This software provides facilities to establish a telecommunications connection between the workstation and the host computer, to invoke execution of a software application stored on that host, and to transfer information between the host application and the workstation as the application runs. When a legacy application is accessed using an emulator, it appears to the legacy application as if it was interacting with a so-called "dumb terminal", instead of an intelligent workstation. The emulator takes care of reformatting the character-based data sent by the legacy application (i.e. using the presentation space to transfer screen data), for display on a modern display screen.

Currently, there is movement in the computer information industry away from using mainframe emulators as the primary user interface to the host applications. Therein lies the problem. When an emulator is no longer used, the emulator's complicated interface logic for translating between the character-based data stream and the modem workstation display screen layout must be performed by some other service.

One solution to this problem is to rewrite the host applications, so that they create their output in a format recognized by modern displays. For most companies, this rewrite of host applications represents a monumental task. Not only are there literally millions of lines of code to rewrite, the skills that are required to program host applications (ability to use the COBOL programming language, for example) are in short supply.

There is an alternative solution to rewriting the host applications, which many IS professionals have chosen. The user interface facilities of many modern application programs accept the existing host presentation space format when retrieving data from the host application, but do not show the data to the user in this format. The new user interface facilities perform a "screen scraping" process, where data is extracted from the host presentation space, and present this scraped data to the user in a form that is appropriate for the modern display screen device. By convention, this form tends to be a graphical user interface where information is presented in a window-based layout. The user interacts with the application using this graphical user interface. When data needs to be returned to the application, for example in response to the user's input, the user interface facility converts this information automatically into a format that is recognized by the host application.

IBM's Emulator High Level Language Application Programming Interface, or "EHLLAPI", was one of the first screen scraping application programming interfaces. EHLLAPI provides an application program with an interface to the presentation space with which legacy applications expect to exchange screen data. This interface has been implemented in a variety of software products, and by many different software vendors. One example of a product using this EHLLAPI interface is IBM's Personal Communications emulator product. EHLLAPI has been available for use for a number of years, and has become a de facto standard for screen scraping. Consequently, there is a great deal of application code in use today which uses EHLLAPI.

EHLLAPI is a procedural interface, and is well-suited for procedural programming languages such as the C programming language. Recently, however, developers have been presented with new object-oriented APIs that better model interaction with a legacy host screen. These new APIs are better suited for use with object-oriented programming languages than is EHLLAPI. One example of the new object-oriented APIs is the eNetwork Host Access Class Library ("HACL") from IBM. HACL provides programming access to 3270, 5250, and Virtual Terminal ("VT") data streams. Another example of an object-oriented API is the pending Open Host Interface Object ("OHIO") standard under development by the Internet Engineering Task Force ("IETF"). (Information on HACL can be found on the World Wide Web at www.sofware.ibm.com/network/technology/hacl, and the draft OHIO standard can be found at http://www.ietf.org/internet-drafts/draft-ietf-tn3270e-ohio-00.txt.) Both HACL and OHIO provide an easier-to-use, more robust methodology for host screen input and output. These object-oriented APIs have facilitated construction of products such as IBM's Host on Demand, in which the EHLLAPI interface cannot be supported due to syntactic differences in object-oriented programming languages and their inherent event-driven nature. Because EHLLAPI is procedurally-oriented, while the new interfaces use an object model, changing existing application programs from use of EHLLAPI to use of an object-oriented interface such as HACL or OHIO could involve significant source code changes and program restructuring. This type of change would be very expensive in terms of programming effort, and would require a considerable amount of time to implement and test. In addition, the source code for the EHLLAPI applications may no longer be available. Further, the programming skills needed for rewriting EHLLAPI applications to use OHIO or HACL (that is, programmers skilled in EHLLAPI and OHIO or HACL) are in short supply.

Accordingly, what is needed is a technique whereby existing applications using EHLLAPI function calls can take advantage of object-oriented host access interfaces, without requiring a rewrite or restructuring of the existing EHLLAPI application.

SUMMARY OF THE INVENTION

An object of the present invention is to provide a technique whereby application programs using EHLLAPI function calls are able to efficiently interact with legacy host application data using an object-oriented host access interface.

Another object of the present invention is to provide a technique whereby these EHLLAPI application programs can interact with the legacy host application data using an object-oriented host access interface without rewriting the workstation EHLLAPI application.

A further object of the present invention is to provide this technique through automated translation from EHLLAPI calls to object-oriented method invocations.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing environment having a connection to a network, for run-time translation of Emulator High Level Language Application Programming Interface (EHLLAPI) function calls to object-oriented host access calls. This technique comprises: creating a session object for a host-connected session to be used for an EHLLAPI application; receiving an EHLLAPI function call from the application; determining a sub-function requested by the function call; determining zero or more method invocations corresponding to the sub-function; performing the method invocations; and returning a single result of the method invocations to the application. Further, the EHLLAPI application uses a sequential procedural model, and the technique further comprises converting the sequential procedural model to an event-driven object-oriented model used by the object-oriented host access calls. The object-oriented host access calls may be those defined in a Host Access Class Library (HACL) specification, those defined in an Open Host Interface Object (OHIO) specification, or those defined in an alternative specification. The technique preferably further comprises creating and initializing a program control block for the application, and creating and initializing a session control block for the session object. In addition, the session object preferably further comprises a presentation space object and an operator information area object, and performing the method invocations preferably further comprises invoking the zero or more determined method invocations on zero or more of the session object, the presentation space object, and the operator information area object.

The present invention will now be described with reference to the following drawings, in which like reference numbers denote the same element throughout.

BRIEF DESCRIPTION OF THE DRAWINGS

FIG. 4 illustrates an example of the function invocation used with EHLLAPI, and the corresponding method invocation in HACL;

FIGS. 6 through 8 depict flow charts which set forth the logic involved to implement the preferred embodiment of the present invention; and FIG. 9 depicts a table listing the EHLLAPI sub-functions.

DESCRIPTION OF THE PREFERRED EMBODIMENT

Figure 1:
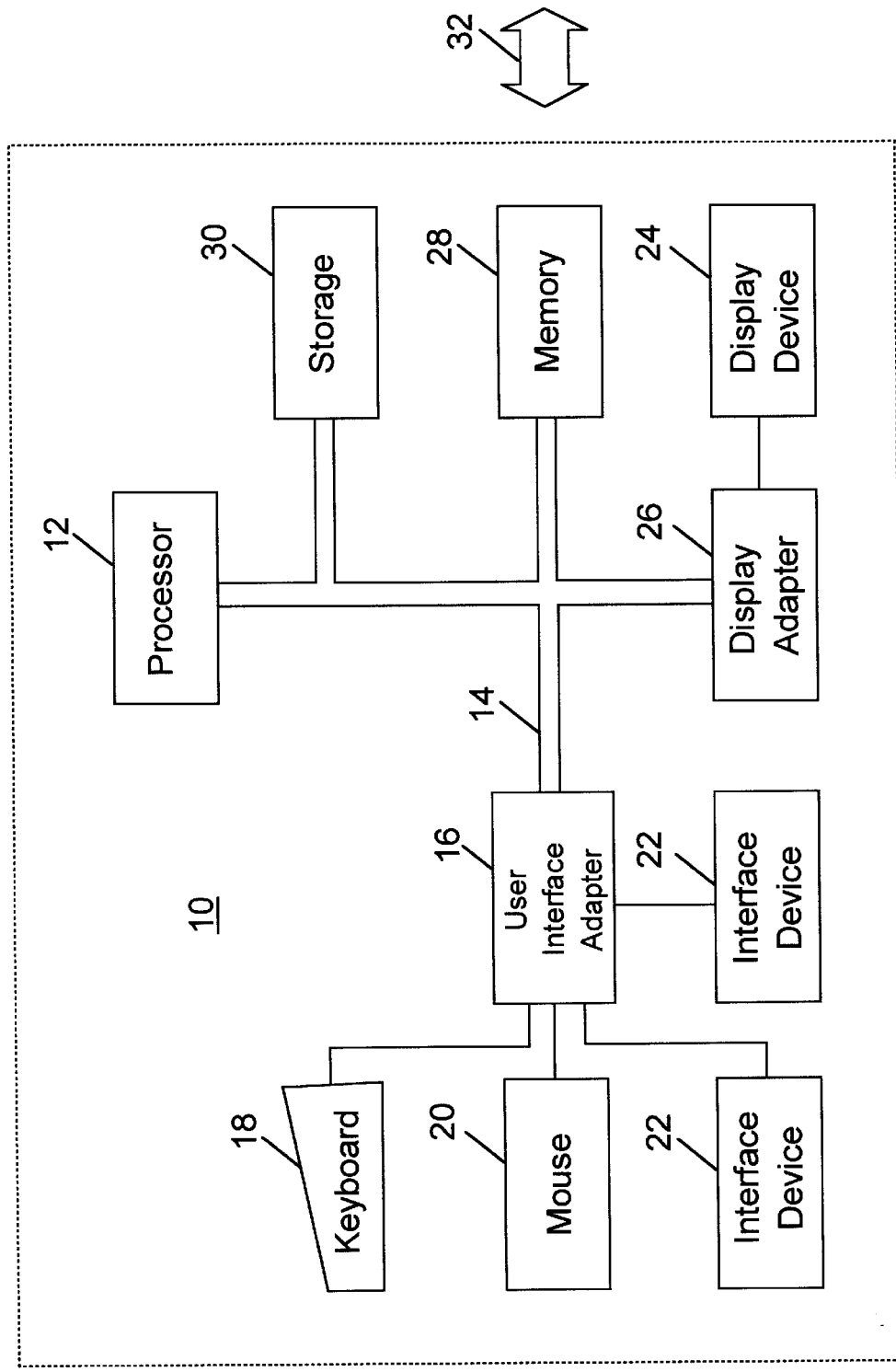
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
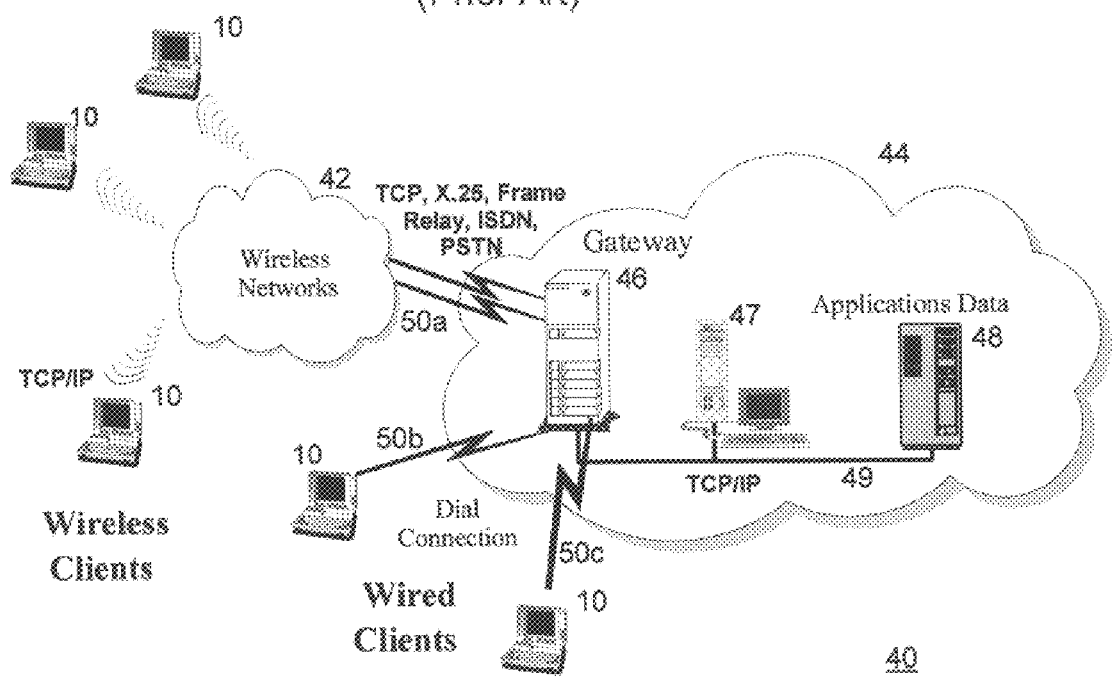
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and/or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Typically, the legacy host application (such as a database management system) will reside on a server that is accessible to the EHLLAPI program through a network. The server on which the legacy host application is running may be functioning as a Web server, where that Web server provides services in response to requests from a client connected through the Internet. Alternatively, the server may be in a corporate intranet or extranet of which the client's workstation is a component.

Availability of a network connection between the computers executing EHLLAPI program and the legacy host application is assumed. The computer executing the EHLLAPI program may connect to the computer executing the legacy host application using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The computer on which the EHLLAPI application executes may be any type of computer processor following the personal computer architecture, including laptop, handheld or mobile computers; vehicle-mounted devices; desktop computers; etc., and having processing and communication capabilities. These techniques are well known in the art, and the hardware devices and software which enable their use are readily available. Hereinafter, the computer on which the EHLLAPI program executes will be referred to equivalently as a "workstation", "device", or "computer", and the term "server" refers to the computer on which the legacy host application executes.

The data retrieved from the legacy host application using the present invention may be displayed on any of the various display devices 24. A user of the EHLLAPI application interacts with the data using any type of interface device such as a keyboard 18, mouse 20, and/or other interface devices 22 (such as a touch sensitive screen, digitized entry pad, etc.).

The preferred embodiment of the present invention will now be discussed with reference to FIGS. 3 through 9.

In the preferred embodiment, the present invention is implemented as one or more modules (also referred to as code subroutines, or "objects" in object-oriented programming) in one or more computer software programs. In the preferred embodiment, the invention will execute entirely on the computer executing the EHLLAPI program.

The present invention maps legacy EHLLAPI function calls to object-oriented method invocations such as those implemented by HACL and OHIO. This mapping enables procedural-based applications using EHLLAPI to retrieve host data from newer host access products (or libraries of function) that only implement object-oriented APIs. EHLLAPI is implemented as a sequential processing model with simple function calls, and requires a persistent connection to an emulator. HACL and OHIO, on the other hand, are based on an object model where most processing is event-driven, and do not use an emulator. The present invention provides a novel technique for translating the EHLLAPI function calls to a corresponding object-oriented method invocation, reconciling the differences between the two computing paradigms in the process. This translation is done automatically, at run-time. Using the present invention, the EHLLAPI application does not need to be rewritten, and the translation will be transparent to a user of this application.

An EHLLAPI program (i.e. an application program using EHLLAPI function invocations) expects a shared library to be available, where this library contains the code that responds to invocation of an EHLLAPI function. The present invention supplies an altered version of this shared library, which receives existing EHLLAPI function calls without change, then translates these functions into object-oriented method invocations. The result of the method invocation is returned to the EHLLAPI program by the altered shared library, as if the original EHLLAPI shared library had processed the function call. The components of the present invention (discussed in more detail below) will be responsible for managing multiple calls from multiple EHLLAPI clients to multiple host sessions, resolving differences in operation, and managing the inherent limitations of EHLLAPI. Using the present invention, the EHLLAPI sub-functions that used to call down into the emulator internals and act on data retrieved from the host will instead be translated into an OHIO/HACL call that will interact with host access objects. To put this novel technique into operation, all the user need do is install a host access product implementing this invention instead of a traditional emulator and associated API.

A number of terms that will be used hereinafter in discussing the present invention will now be introduced. These definitions are meant to clarify the use of the terms in this document, and may differ from technical definitions in other contexts. Many of these terms may have different connotations with respect to particular platforms, programming languages, or specific APIs.

Program: A body of software that executes instructions and operates on data.

Thread: A set of instructions that runs sequentially. A program employs at least one thread but may employ many.

Pointer: A value that represents a memory location. It is used to reference specific data in a program.

Reference: A special type of pointer that has some restrictions as to how it may be used. The word "pointer" will be used in this document to refer to both pointers and references.

Symbol: A string of characters (usually a name) that represents a memory location within a program or a value. A symbol may refer to either a fixed or a variable location or value.

Mnemonic: A symbol that has been uniquely assigned to a fixed value. For example, the mnemonic "ENTER" may be assigned to represent the value corresponding to pressing the enter key on a keyboard.

Flag: A value (usually a Boolean value) that is used in a program to indicate a given condition. A flag can be referenced to determine if the associated condition exists or does not exist.

Object: Refers to a specific type data and code grouping that allows better modeling of systems. An object typically embodies all of the necessary values and logic to handle specific operations with regard to the idea it is supposed to represent.

Host Emulation Program: A program that allows a computer to behave as if it were a terminal connected to a remote host computer. Typically, but not always, host computers are mainframe computers (e.g., an AS/400 or Enterprise Systems Architecture/390 computer).

Function: A body of code that performs specific operations on given data. A function has a name (i.e. a symbol), may take arguments, and may return results. A program must mark its memory location and then transfer control to the function's location to execute the function, and then return control to the marked memory location after the last instruction in the function. After the return, all data resulting from the function call is immediately and locally available.

Callback: A callback is a special kind of function that is called outside of the normal sequence of instruction execution. Typically, the address of the callback is given to another program or thread so that the function can be called under prescribed circumstances. This type of function facilitates event-driven programming.

Method: A function that is part of an object.

Parameter: A parameter is information that is passed to a function for processing. There are no limitations on the type of information that may be used as a parameter. A parameter may also be referred to as an argument.

API: A program that provides special functionality to another program. API is an acronym for Application Programming Interface.

EHLLAPI: Emulator High Level Language API. EHLLAPI provides a set of functions for communicating with a legacy host system from a customer application program, through a host emulation program. There are several versions of EHLLAPI, such as 16- and 32-bit versions of IBM Standard EHLLAPI, IBM Enhanced EHLLAPI, and WinHLLAPI.

HACL: Host Access Class Library. An object library from the IBM Corporation. HACL provides a set of objects for communicating with a legacy host system from a customer application program. HACL does not need a host emulation program.

OHIO: Open Host Interface Objects. Provides a set of objects for communicating with a legacy host system from a customer application program. OHIO does not need a host emulation program. OHIO is the proposed IETF standard for an object library that allows host connectivity.

EHLLAPI Program: A program that employs EHLLAPI to transfer data with a host system.

Shared Library: A body of compiled code that is linked to another body of compiled code at runtime, and which contains an API. The file extension for a shared library may be, but is not limited to, "DLL", "SO", or "SL".

Entry Point: A symbol that a program must use to access functionality within a shared library. An entry point is specified when the shared library is created. There is no limit to the number of entry points (i.e. symbols) a shared library may have.

Figure 3:
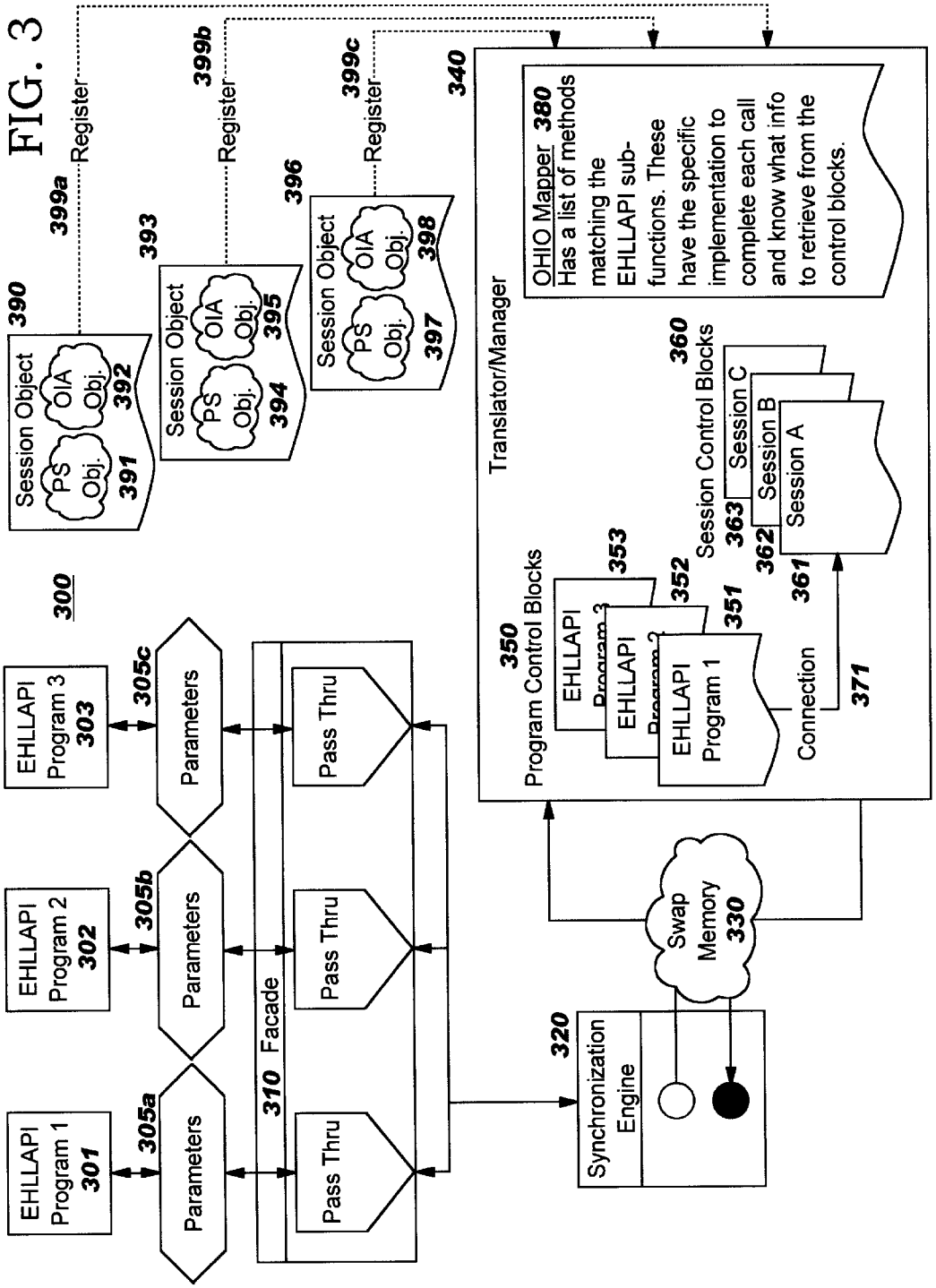
FIG. 3 illustrates an overview of the components used in the preferred embodiment of the present invention.

Returning now to the discussion of how the present invention operates, FIG. 3 illustrates an overview of the components used in the preferred embodiment of the present invention. (The logic with which these components operate will be discussed in more detail with reference to FIGS. 6 through 8.) Some number of EHLLAPI application programs will be executing, invoking EHLLAPI function calls. Three EHLLAPI applications 301, 302, 303 are illustrated in FIG. 3, although more or fewer such applications may be executing at a point in time. (Note that an implementation of the present invention may use an alternative structure to that depicted in FIG. 3, for example by combining the function of multiple components into a single component, without deviating from the inventive concepts disclosed herein.)

As an EHLLAPI program executes, it will periodically issue the single EHLLAPI function call "hllapi" (discussed in more detail below, with reference to FIG. 4). (When WinHLLAPI is being used, this single function call is "WinHLLAPI". Subsequent discussions will refer simply to the "hllapi" function call.) This function call requires 4 parameters, which are passed to and from the EHLLAPI shared library in the current art. In the present invention, a component that will be referred to hereinafter as the "facade" replaces the standard EHLLAPI shared library as the interface to the EHLLAPI application. The facade is depicted in FIG. 3 at element 310. As stated above, the facade receives existing EHLLAPI function calls without requiring any change to the function call syntax, but these function calls are then translated (as will be described in more detail below, with reference to the translator/manager component 340) into object-oriented method invocations. Accordingly, the facade will have the same file name and entry point names as the expected shared library, and will expect (and process) the same 4 parameters. FIG. 3 illustrates the parameters being passed to the facade 310 at elements 305a, 305b, and 305c. The result of the method invocation is returned to the EHLLAPI program by the facade, in the same format (that is, using the parameters of the hllapi function call) as if the original EHLLAPI shared library had processed the function call.

Upon receiving a parameterized function invocation from an EHLLAPI program, the facade 310 calls into another shared library. This shared library is referred to hereinafter as the "synchronization engine", and is another novel component of the present invention. The synchronization engine is depicted at element 320 of FIG. 3. The synchronization engine 320 has its own unique entry point which is invoked by the facade 310. This invocation supplies the 4 EHLLAPI parameters, as well as information regarding the origin of the function call. This latter information comprises: an identification of which version of EHLLAPI the calling program (301, 302, 303, etc.) is using; the process identifier ("ID") associated with the calling program; and the thread ID from which the call originated. (The process and thread ID may be obtained by issuing system calls.)

The synchronization engine 320 manages the flow of the API calls. The EHLLAPI program 301, 302, 303 will issue a single EHLLAPI function call at a time, and will expect that call to return immediately with all the appropriate data in place. OHIO and HACL use an object model, and require that a program first instantiate the object that embodies the functionality desired and then invoke methods on that object instance to perform the desired function(s) or use the object instance to monitor events related to the host connection, looking for state changes. (For these state changes, EHLLAPI programs are able to merely ask whether a change has occurred; in OHIO/HACL, it is necessary to maintain information about the state in order to detect a change, and notify the EHLLAPI application of the change using a callback. See the descriptions of the "Start Host Notify" and "Query Host Update" mappings, below.) To reconcile the differences between the procedural, sequential approach used in EHLLAPI (and expected by EHLLAPI programs) and the event-driven approach used in OHIO and HACL (i.e. to synchronize operation between the disparate models), the synchronization engine must artificially block continuation of the program (as will be illustrated below with reference to FIG. 7) until all of the return data associated with the invoked EHLLAPI function is accumulated and stored in the manner expected by the EHLLAPI program.

The synchronization engine 320 communicates with the translator/manager component 340 by sending events to the translator/manager 340, where the data for those events is stored in an area of memory referred to herein as "swap memory" 330. ("Swap memory" refers to memory that is globally available to all programs that link to this shared library.) For example, when an application program 301, 302, 303 invokes an EHLLAPI function call, the synchronization engine 320 stores the function call's 4 parameters into swap memory 330 and then signals the translator/manager 340 that there is data to process.

The translator/manager component 340 of the present invention is so named because it is responsible for keeping track of, or managing, all EHLLAPI applications and all host-connected sessions that are EHLLAPI-enabled, and is also responsible for retrieving the information sent in from an EHLLAPI program and finding the appropriate OHIO/HACL calls to make (i.e translating the calls from EHLLAPI to OHIO or HACL, as appropriate) to complete the requested processing.

To manage the running EHLLAPI programs, the translator/manager 340 records identifying information about each one (e.g., process ID, thread ID, etc.) and also information that identifies which host-connected session the application is interacting or requesting interaction with. To manage the EHLLAPI-enabled host-connected sessions, the translator/manager 340 records identifying information about the session object instance (i.e., a pointer to it or its object ID within a Java Virtual Machine), and each session must be assigned a name. (EHLLAPI programs require that sessions have one character names within the range of "A" through "Z" (or equivalently, "a" through "z"). OHIO and HACL do not limit session names in this manner, and thus the translator/manager 340 is responsible for generating an OHIO or HACL session name, and correlating this name with an associated EHLLAPI session name for the same session.) The information regarding executing EHLLAPI programs is recorded in "program control blocks" 350. (As is known in the art, a control block is an area or object, when using object-oriented programming, in memory or storage.) There will be one program control block for each EHLLAPI program. FIG. 3, illustrates 3 program control blocks 351, 352, and 353, which are associated with programs 301, 302, and 303, respectively. The identifying information about the session object instances is recorded in "session control blocks" 360. One session control block will represent each host-connected session. FIG. 3 shows 3 session control blocks 361, 362, and 363, having EHLLAPI session names "A", "B", and "C", respectively. (As will be obvious, there may be more or fewer than 3 program control blocks and 3 session control blocks at a particular point in time. Three are used in FIG. 3 for illustrative purposes.)

FIG. 3 also shows 3 session objects 390, 393, and 396. Each session object further comprises a presentation space object (designated in FIG. 3 as "PS Obj" at 391, 394, and 397) and an OIA Object (shown at elements 392, 395, and 398). The structure of the session objects is further discussed with reference to FIG. 5, below. Whenever an EHLLAPI-enabled host-connected session is started, a session object is created. The session object then registers with the translator/manager 340, as shown at 399a, 399b, and 399c. It is this registration process that results in creation of a session control block 360 for the registering session. The translator/manager records all the necessary data regarding the session in the session control block, creates a thread for the session, and pauses the thread until it is signaled by the synchronization engine to process an EHLLAPI call for that session. In the preferred embodiment, the translator/manager also places the block in a list of session control blocks.

When an EHLLAPI program issues its first EHLLAPI call, the translator/manager 340 establishes a program control block 350 for it, and assigns a unique name for the application program based on its process and thread ID. In the preferred embodiment, the translator/manager also places the block in a list of program control blocks. This program name is written into the associated session control block, identifying which EHLLAPI program is using this session. Connection 371 in FIG. 3 is an abstract indication that a particular EHLLAPI program (in this example, program 1 as depicted at element 351) is currently interacting with a particular EHLLAPI session (session "A", at 361, for this example). The connection information stored in the control blocks (i.e. the session name in the program control block, and the application name in the session control block) provides the necessary consistency for allowing the expected persistent association between an EHLLAPI program and a host-connected session, such that the on-going state of a connection from a program to a particular session can be maintained.

The lists of program control blocks and session control blocks (not shown in FIG. 3) kept by the translator/manager enable it to manage multiple EHLLAPI programs and multiple sessions. (Note that while the description of the preferred embodiment refers to using lists for managing control blocks, this is not meant to limit this aspect of the present invention to a particular implementation technique such as a linked list structure.)

In the preferred embodiment, each session has its own thread and therefore has its own instance of the translator/manager for use with that thread. When the session's translator/manager gets a signal from the synchronization engine, it retrieves the information from the swapping area 330 and determines which program made the call by looking in the session control block and extracting the application program name therefrom. Once the caller has been identified, the translator/manager locates the caller's program control block and determines which session it has a conversation with. The translator/manager then uses that information to locate the appropriate session control block from the list of control blocks recording all EHLLAPI-enabled sessions. From the information in that session control block, the translator/manager uses the recorded object identifier to make HACL/OHIO calls.

The HACL/OHIO mapper component 380 is responsible for determining which EHLLAPI sub-function was requested, and how to complete the functionality of that requested call. Typically, although not always, this mapping process requires translation of the EHLLAPI call into one or more HACL/OHIO method invocations. (The details of mapping particular calls are discussed in more detail below, with reference to FIG. 9.) The method is invoked on the particular session object determined from accessing the session control block associated with the requesting application, as just discussed. The session object interacts with the legacy host application (not shown in FIG. 3) according to the particular method invoked, using techniques which do not form part of the present invention.

The result(s) of the method invocation are returned by the session object to the translator/manager 340, which then copies the information into the swap memory 330 and notifies the synchronization engine 320 that result data is available. The synchronization engine 320 then extracts the results from the swap memory 330, formats the result data into the 4-parameter format expected by the requesting EHLLAPI application, and passes this data back to the facade 320 using the 4 parameters. The facade 320 then returns the result data to the requesting EHLLAPI application, through the parameters of the hllapi function call. The EHLLAPI function call has now completed, using the services of an object-oriented API in a manner that is transparent to the application program.

FIG. 4 illustrates an example of the function invocation syntax used with EHLLAPI. EHLLAPI calls are simple function calls. As stated earlier, all EHLLAPI calls use the same symbol, "hllapi" (or "WinHLLAPI"), which has four parameters. Each of the parameters is a pointer to data that describes the desired functionality, as is known in the art. Element 405 of FIG. 4 illustrates the function call syntax, and its parameters 405, 410, 415, and 420. The first parameter 410 is a pointer to a number that represents the EHLLAPI sub-function to be executed. (FIG. 9 lists the EHLLAPI sub-functions, and the number corresponding to each.) This is represented in FIG. 4 by the arrow 411, which points to an area 412 of memory or storage containing the requested sub-function number. The second parameter 415 is a pointer (represented by element 416) to data 417 that is specific to the sub-function. This data 417 may vary greatly in size and content, depending on the sub-function to which it corresponds. The third parameter 420 is a pointer (represented by element 421) to a value 422 that is the length of the data 417 pointed to by the second parameter 415. Finally, the fourth parameter 425 is a pointer (represented by element 426) to where a value 427 indicating the success of the sub-function will be written when the function invocation completes.

FIG. 4 further illustrates an example 440 of using the hllapi function invocation, and the corresponding method invocation in HACL. This example conveys to a legacy host application that a user of the EHLLAPI application has entered the letters "ABC" and has then pressed the ENTER key. In EHLLAPI, the sub-function used to convey this type of information is the "send key" sub-function. The EHLLAPI application must first allocate storage to hold the values for each of the 4 parameters. Graphical pointer symbols 441, 442, 443, and 444 are used in the example function invocation 440, whereas the actual storage or memory location addresses would be used in a real invocation. As shown at 451, the symbol representing the "send key" sub-function is the number 3. Pointer 442 indicates that the data to be used for this send key sub-function is "ABC@E", as shown at 452. (As is known in the art, the mnemonic "@E" represents the ENTER key in EHLLAPI.) This data is 5 characters in length, as indicated by the value 5 in element 453, pointed to by element 443. The final pointer 444 points to an empty area 454, as no sub-function outcome is appropriate at this time.

The method invocation used by HACL to send the information of example 440 to a legacy host application is shown at 470. Here, the "SendKeys" method is invoked on an instance "ps" of a presentation space object. The parameter passed to this method is "ABC[enter]", where "[enter]" is the HACL mnemonic which represents the ENTER key.

The translator/manager component 340 of the present invention is responsible for translation from the syntax in example 440 to the syntax 470 (using information supplied by the other components, as described herein). As can be seen in FIG. 9, there are many different EHLLAPI sub-function symbols. Each symbol represents a separate EHLLAPI sub-function, with sub-function-specific information being exchanged through the 4 parameters for each sub-function.

Figure 5:
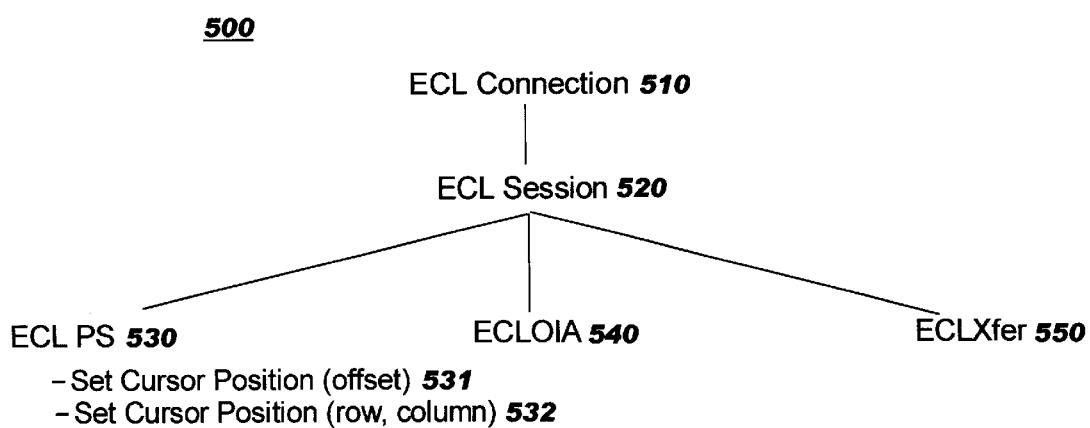
FIG. 5 illustrates the preferred embodiment of the object model for the object-oriented application programming interface which is used in the present invention.

FIG. 5 illustrates the preferred embodiment of the object model 500 for the object-oriented application programming interface which is used in the present invention. This object model 500 corresponds to the model implemented in the HACL interface for the Java programming language. ("Java" is a trademark of Sun Microsystems, Inc.) Object names and method invocation names defined for this model are referred to hereinafter in order to more fully illustrate the operation of the preferred embodiment of the present invention. (It will be obvious to one of ordinary skill in the art that other object names and other method names may be substituted in alternative embodiments when using models other than HACL for Java, such as the OHIO model, without deviating from the inventive concepts of the present invention.) An instance of the ECLConnection class 510 encapsulates the connection information for a session with a host, and the characteristics of that connection (such as its status, its name, whether it is a 3270 or 5250 connection, etc.). ECLSession 520 inherits from ECLConnection 510, and an instance of ECLSession contains a collection of all the connection-specific objects for a particular connection. An ECLSession object contains an instance of the ECLPS (presentation space) class 530, the ECLOIA (Operator Information Area) class 540, and the ECLXfer class 550 (which is used for file transfers). Each object has certain methods which are available for use with that object. For example, the cursor can be positioned at a specific location within the presentation space by invoking either of two different "SetCursorPosition( . . . )" methods 531, 532 on a presentation space object (i.e. on an instantiation of ECLPS class 530). The details of how the classes and methods in the HACL interface operate do not form part of the present invention. Accordingly, these classes and methods are discussed herein in terms of the function they provide, and how they are accessed. For more information on HACL and HACL for Java, refer to address www.software.ibm.com/network/technology/hacl/publications/toolkit/hacl/ECLReference.html on the World Wide Web.

FIG. 6 depicts the flow of control between an EHLLAPI application 610 (which corresponds to element 301, 302, or 303 of FIG. 3) and the facade component 620 (which corresponds to element 310 of FIG. 3). The application 610 comprises an executing program, depicted by representative source code at element 611. When the executing program 611 encounters an invocation 612 of the hllapi function, the hllapi entry point will be called 613 as usual. However, when the present invention is used, the facade 620 replaces the EHLLAPI library which is used in the current art to process hllapi function calls. The facade 620 receives the EHLLAPI request 613, as shown by the hllapi function signature (element 622) of hllapi function 621. The facade 620 invokes the synchronization engine (see element 623) to process the request, passing along the 4 parameters as they were given by the application 610. The processing of the synchronization engine component is described in FIG. 7. When the synchronization engine returns the function result to the facade 620, the facade 620 then returns the result data to the requesting application 610 as shown by arrow 624. This result data is also passed through the facade 620 unmodified.

When the WinHLLAPI interface is used, the WinHLLAPI application 630 includes invocations of the WinHLLAPI interface as illustrated at 632. The entry point in the facade 640 now uses the symbol WinHLLAPI, as shown at 642. With these exceptions, operation is identical to that just described for the EHLLAPI interface.

Figure 7:
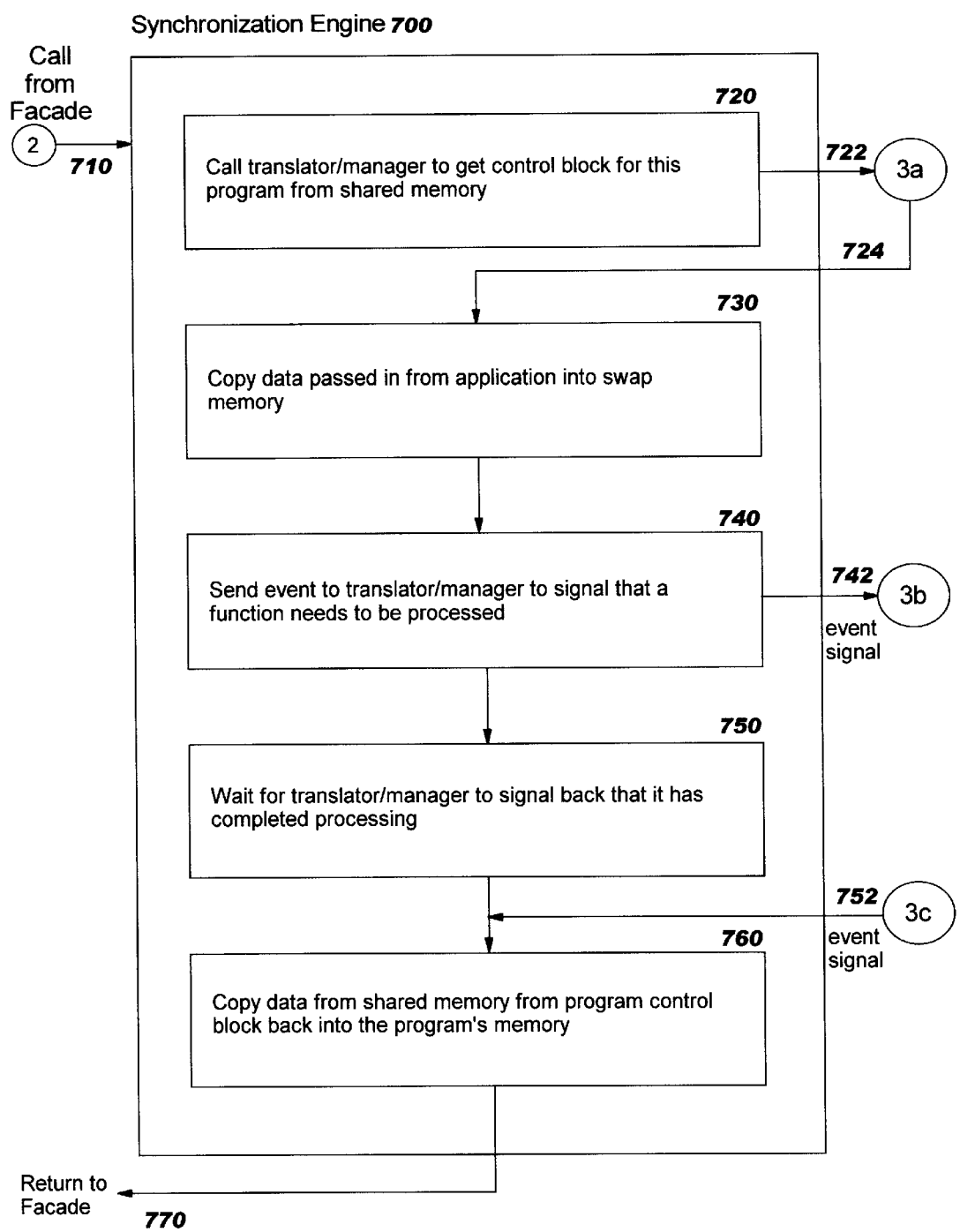

FIG. 7 depicts a flow chart which sets forth the logic involved in the preferred embodiment of the present invention to implement the synchronization engine (element 320 of FIG. 3). The process begins at 710, where the synchronization engine has been invoked from the facade 620 as depicted at 623 (or 643, when using WinHLLAPI) of FIG. 6. Block 720 calls the translator/manager, as indicated at 722, to get the program control block for this program. This process is described in more detail in FIG. 8. Upon returning from this invocation, as shown at 724, Block 730 then copies the data passed in from the application program (i.e. the values of the 4 parameters) into the swap memory (element 330 of FIG. 3).

Block 740 sends an event to the translator/manager, signaling it that a function has been requested and needs to be processed. Element 742 shows this event being signaled. It will be processed according to FIG. 8. Control transfers from Block 740 to Block 750, which implements a wait operation. This wait operation suspends operation of the synchronization engine for the current request, until such time as the translator/manager signals at 752 that it has completed the processing of the requested function. Techniques for implementing a wait operation are well known in the art.

Upon receiving the event completion signal 752, control continues to Block 760 where the result data is copied from swap memory back into the locations of the original 4 function parameters (where these locations correspond to locations within the calling program's memory or storage). Operation of the synchronization engine for this function call is then complete, and control is returned to the facade component as shown at 770.

Figure 8:
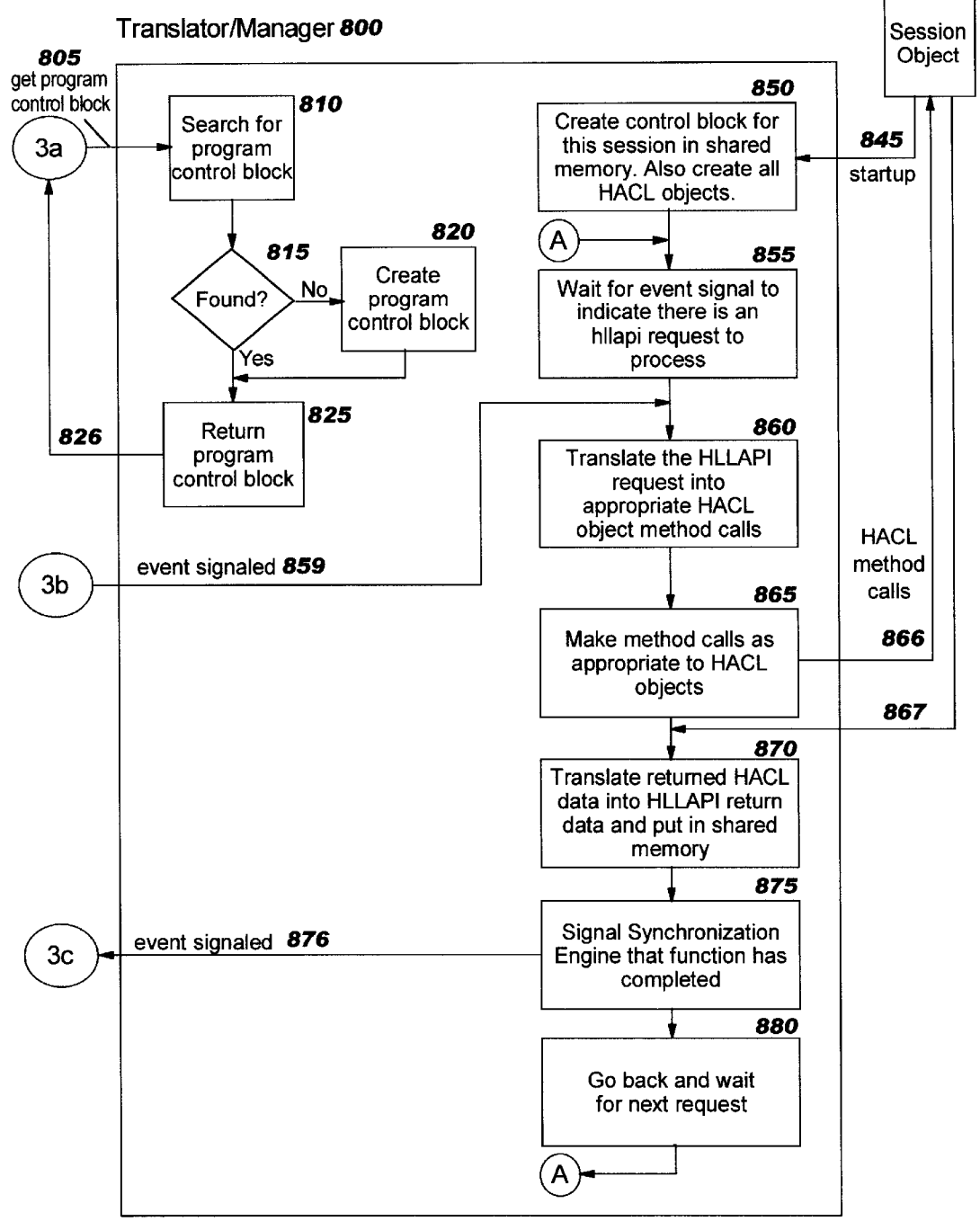

FIG. 8 depicts a flow chart which sets forth the logic used in the preferred embodiment of the present invention to implement the translator/manager component 800. When the synchronization engine requests a program control block from the translator/manager, as depicted at 805 (and element 722 of FIG. 7), the translator/manager searches its list of program control blocks at Block 810. If a program control block for the requesting application is located, the test at Block 815 has a positive response, and Block 825 returns the located program control block to the synchronization engine at 826 (which corresponds to return arrow 724 in FIG. 7). Otherwise, a program control block is created at Block 820 and initialized (as described with reference to program control block 350 of FIG. 3). Control then transfers to Block 825.

When a session object 840 is created, it registers 845 with the translator/manager (as described with reference to session objects 390, 393, and 396 of FIG. 3). As indicated by Block 850, this registration process creates and initializes a session control block, and then the objects required for operation of the HACL interface are created. (Specifically, a session object, a presentation space object, an OIA object, and a file transfer object such as those depicted at 520, 530, 540, and 550 of FIG. 5 are created when using HACL for Java. It may happen that one or more of these objects has already been instantiated by the session ; in that case, the object will be registered but a new instance will not be created. When using OHIO with the present invention, instead of HACL, the appropriate OHIO objects will be created. No file transfer object has been defined in OHIO at the present time, but session, presentation space, and OIA objects are defined.) Control then transfers to Block 855, where the translator/manager waits for an event signal from the synchronization engine. When this event signal occurs, as depicted at 859 (corresponding to 742 of FIG. 7), this is an indication that a request has arrived and is ready to be processed. Control continues to Block 860, where the hllapi request is translated into the appropriate HACL (or OHIO, as appropriate) method call or calls. (See FIG. 9 and its accompanying description for more information.) Block 865 then invokes these method calls on the HACL objects, as indicated at 866. When the method invocation completes, the result is returned to the invoking code (i.e. the translator/manager) at 867.

Block 870 translates the returned HACL data into the EHLLAPI format expected by the synchronization engine for returning to the requesting application, storing the translated result in the shared (i.e. swap) memory. Block 875 then signals the synchronization engine at 876, informing it that the requested function has completed. (This event signal is received at 852 in FIG. 7.) The processing of the translator/manager for this request is now complete, and as indicated at Block 880, control returns back to Block 855 to await the next function request.

FIG. 9 depicts a table 900 listing the EHLLAPI sub-functions. For each sub-function, its numeric identifier (which is used as the first EHLLAPI parameter when invoking this sub-function) is given in the "Fn #" column 910, followed by its sub-function name in the "Function Name" column 920. The "Notes" column 930 is discussed below. These EHLLAPI sub-functions are mapped to HACL or OHIO methods, as has been stated. The following discussion summarizes, by illustration with several selected sub-functions, how the program and session control blocks will be used, and how the stored object identifiers will facilitate mapping the function calls to specific HACL methods. In this illustration the EHLLAPI sub-function name is first given, followed by a number, where that number is the value that is referenced by the first parameter on the EHLLAPI function call and indicates which sub-function is being called. Following the sub-function name and number, a brief description of what the sub-function does in existing EHLLAPI implementations is given. This is followed by a description of how the translator/manager will map that particular sub-function call. Not all EHLLAPI sub-functions are illustrated here: only a few of the more commonly used sub-functions are described. It will be obvious to one of skill in the art how to extend this mapping technique to the remaining sub-functions of FIG. 9. Note that a number of the EHLLAPI sub-functions are not supported directly in HACL, such as sub-function 11 which has the sub-function name "Reserve" and which is used to lock the keyboard. (See element 940 of FIG. 9.) These sub-functions are indicated in FIG. 9 by the presence of an asterisk in the "Notes" column 930, and may be implemented by translation into product-specific system calls or method invocations, as determined by the environment in which the present invention is installed. In the preferred embodiment when using HACL for Java, the Java Native Interface ("JNI") is used to provide support for these product-specific mappings. As is known in the art, the JNI is a standard, virtual machine independent interface used to enable Java applications to call native libraries of code written in other languages such as C or C++.

Connect Session (1): Identifies a specific host-connected session with which an application wishes to interact, so that all subsequent function calls from the application will be directed to that session. In EHLLAPI, the session is identified by a one-character name in the range "A" to "Z" (equivalently, "a" through "z").

The translator/manager maps this sub-function by first finding the session control block for the identified session, and marking it as "in-use" by saving the connecting application's name (generated from its process ID, or process and thread ID if it is a WinHLLAPI application, as described earlier). Then, the session name is saved in the application's program control block. This process "connects" the session to the application. (No actual OHIO/HACL method calls are required here.)

Disconnect Session (2): Releases the indicated session from being connected to an EHLLAPI program, and frees the program to connect to a different session.

The translator/manager maps this sub-function by first finding the session control block for the indicated session, and clearing the data indicating its "in-use" state. Also, the translator/manager clears all data in the program's control block that previously indicated a connected session. (No actual OHIO/HACL method calls are required here.)

Send Key (3): This function artificially posts one or more keystrokes to the presentation space at the current cursor location.

The translator/manager maps this sub-function by first identifying the connected session as indicated in the applications program control block, as described above in Connect Session. Then, any EHLLAPI mnemonics (determined by presence of the "@" symbol in the data pointed to by the second parameter) in the data string are converted to HACL/OHIO mnemonics (using a lookup table which identifies the proper conversion). A pointer to the presentation space object is obtained from the session object (identified in the session control bock). The SendKey method is then invoked on this presentation space object, passing along the modified values.

Wait (4): This sub-function interrupts the application's processing of instructions until the session is in a "not-busy" or "non-inhibited" state (such that the application program will resume when the session is ready for input).

The translator/manager maps this sub-function by identifying the connected session, as indicated in the application's program control block. Then, the translator/manager locates the OIA object for that session and registers on behalf of the EHLLAPI program as an event listener (using the ECLOIANotify method in HACL, or corresponding method in OHIO). The translator/manager passes a pointer to a callback routine on this method invocation. When the callback routine is triggered, it will determine the state of the session, looking for an event indicating that the session is ready for input. When the callback identifies that the session is in the ready state, it will post the event, thus allowing this EHLLAPI Wait call to return.

Copy Presentation Space (5): This function copies the contents of the presentation space to a memory location indicated by the second parameter of the EHLLAPI call.

The translator/manager maps this sub-function by identifying the connected session, as indicated in the application's program control block. It then retrieves the presentation space object for that session, analyzes all session parameters that have been set (using the Set Session Parameters sub-function, described below), if any, and determines what information must be copied from the presentation space according to the session parameter settings. The OHIO/HACL presentation space stores information in virtual planes, and each applicable plane must be retrieved individually using a separate method invocation. Traditional emulators also have planes, though not always the same number or all the same types of planes. EHLLAPI expects all of the presentation space information to be returned in a single buffer. Thus, the translator/manager must call the GetScreen method in the presentation space object for each plane that contains the information indicated by the session parameters and weave them together so that the information is consistent with the EHLLAPI application's expectations. For example, in EHLLAPI each character in the presentation space is followed by a code indicating the color in which to display that character, and any extended attributes (such as "input inhibited") that are appropriate. The translator/manager uses information from the retrieved planes, and creates a result using this expected format.

Search Presentation Space (6): Searches the presentation space for specific text and returns the position of that text, if it is found.

The translator/manager maps this sub-function by identifying the connected session, as indicated in the application's program control block. It then calls the SearchText method in the presentation space object, using the text to be searched for as passed in from the application.

Query Cursor Location (7): This method returns the current position of the cursor in the presentation space.

The translator/manager maps this sub-function by identifying the connected session, as indicated in the application's program control block, locating the presentation space object for that session, and then invoking the GetCursor method on that object.

Set Session Parameters (9): This function saves special values that are represented by published mnemonics. These values indicate custom behaviors of the API.

The translator/manager maps this sub-function by receiving and interpreting the incoming strings, and using those to record the desired session parameters as settings in the application's program control block. (No actual OHIO/HACL method calls are required here.)

Copy OIA (13): This sub-function returns a copy of the OIA followed by additional flags that describe the state of the presentation space in a way that is more convenient for a program to read.

The translator/manager maps this sub-function by identifying the connected session, as indicated in the application's program control block, and retrieving the OIA object from that session by invoking the GetOIA method on the session object. The translator/manager makes a copy of this returned OIA. The OIA object contains a number of methods that return specific state information, as they would be indicated by the data returned by the single EHLLAPI call. Each of these specific OIA methods is invoked, in order to retrieve flags conveying this state information. The translator/manager uses this information to construct an OIA image in the same manner that an emulator would for display, and concatenate each flag to the end of the previously-constructed OIA data. This entire block of data will be eventually copied to the memory referenced by the original EHLLAPI call's second parameter.

Start Host Notify (23): This sub-function indicates that the EHLLAPI program wants to be notified whenever there is a change in the current state of the indicated session item (i.e., Presentation Space (PS), Operator Information Area (OIA), or both). The notification can be by event or by operating system message. In EHLLAPI, this notification is most often simply recorded, and the EHLLAPI program continually polls for the information.

To map this functionality, the translator/manager adds this application to a list of those which have issued Start Host Notify, and then registers this application as an event listener which is listening for changes in the presentation space, the OIA, or both (as indicated by the settings in the second parameter for this sub-function invocation). This registration is accomplished by first getting references to the ECLPS and/or ECLOIA objects, constructing ECLPSListener and/or ECLOIANotify objects, and then invoking the ECLPS.RegisterPSNotify method and/or ECLOIA.RegisterOIANotify method, passing the ECLPSListener and/or ECLOIANotify objects as parameters, or a pointer to the ECLPSListener and/or ECLOIANotify object(s). The translator/manager then gets a copy of the current presentation space and/or OIA for this session, using the GetPS and/or GetOIA method invocation(s) for the session object recorded in this application's program control block. The translator/manager then monitors changes to this data. When an event occurs, the nature of the event is recorded in each of the listening program's control blocks and, if requested, an event is signaled to all EHLLAPI applications in the list of those registered as listeners for changes, using a specific callback method within the registered object (i.e. the ECLPSListener or ECLOIANotify objects).

Query Host Update (24): After a Start Host Notify has been issued and an update occurs, the update and what was updated can be queried with this sub-function. In EHLLAPI, this is most often done in a loop that uses this function to continuously poll for an update indicator.

In this mapping, the updates will be recorded in the program's control block, so the translator/manager has little to do but to consult the block and return the information. (No actual OHIO/HACL method calls are required here.)

As has been demonstrated, through the novel techniques of the present invention, the unmodified application was able to make its EHLLAPI call as usual, and all of the information shuffling was done transparently. Also note that, since it is not unusual for shared libraries to call each other and for many subroutines to be called in any API processing, there should be little no performance difference when using the present invention as compared to using the EHLLAPI interface expected by the EHLLAPI application.

While the preferred embodiment of the present invention has been described, additional variations and modifications in that embodiment may occur to those skilled in the art once they learn of the basic inventive concepts. In particular, the techniques of the present invention may be used with other procedural interfaces instead of the EHLLAPI interface and/or with other object-oriented interfaces in place of HACL or OHIO, provided inter alia a suitable mapping can be determined between the procedural and object-oriented interfaces. Therefore, it is intended that the appended claims shall be construed to include both the preferred embodiment and all such variations and modifications as fall within the spirit and scope of the invention.

We claim:

1. In a computing environment having a connection to a network, computer readable code readable by a computer system in said environment for run-time translation of Emulator High Level Language Application Programming Interface (EHLLAPI) function calls to object-oriented host access calls, comprising:
   a subprocess for creating a session object for a host-connected session to be used for an EHLLAPI application;
   a subprocess for receiving an EHLLAPI function call from said application;
   a subprocess for determining a sub-function requested by said function call;
   a subprocess for determining zero or more method invocations corresponding to said sub-function;
   a subprocess for performing said method invocations; and
   a subprocess for returning a single result of said method invocations to said application.

2. Computer readable code for run-time translation of EHLLAPI function calls to object-oriented host access calls according to claim 1, wherein said EHLLAPI application uses a sequential procedural model, and further comprising one or more subprocesses for converting said sequential procedural model to an event-driven object-oriented model used by said object-oriented host access calls.

3. Computer readable code for run-time translation of EHLLAPI function calls to object-oriented host access calls according to claim 1, wherein said object-oriented host access calls are those defined in a Host Access Class Library (HACL) specification.

4. Computer readable code for run-time translation of EHLLAPI function calls to object-oriented host access calls according to claim 1, wherein said object-oriented host access calls are those defined in an Open Host Interface Object (OHIO) specification.

5. Computer readable code for run-time translation of EHLLAPI function calls to object-oriented host access calls according to claim 1, further comprising:
   a subprocess for creating and initializing a program control block for said application; and
   a subprocess for creating and initializing a session control block for said session object.

6. Computer readable code for run-time translation of EHLLAPI function calls to object-oriented host access calls according to claim 1, wherein said session object further comprises a presentation space object and an operator information area object, and wherein said subprocess for performing said method invocations further comprises a subprocess for invoking said zero or more determined method invocations on zero or more of said session object, said presentation space object, and said operator information area object.

7. A system for run-time translation of Emulator High Level Language Application Programming Interface (EHLLAPI) function calls to object-oriented host access calls in a computing environment having a connection to a network, comprising:
   means for creating a session object for a host-connected session to be used for an EHLLAPI application;
   means for receiving an EHLLAPI function call from said application;
   means for determining a sub-function requested by said function call;
   means for determining zero or more method invocations corresponding to said sub-function;
   means for performing said method invocations; and
   means for returning a single result of said method invocations to said application.

8. The system for run-time translation of EHLLAPI function calls to object-oriented host access calls according to claim 7, wherein said EHLLAPI application uses a sequential procedural model, and further comprising means for converting said sequential procedural model to an event-driven object-oriented model used by said object-oriented host access calls.

9. The system for run-time translation of EHLLAPI function calls to object-oriented host access calls according to claim 7, wherein said object-oriented host access calls are those defined in a Host Access Class Library (HACL) specification.

10. The system for run-time translation of EHLLAPI function calls to object-oriented host access calls according to claim 7, wherein said object-oriented host access calls are those defined in an Open Host Interface Object (OHIO) specification.

11. The system for run-time translation of EHLLAPI function calls to object-oriented host access calls according to claim 7, further comprising:
    means for creating and initializing a program control block for said application; and
    means for creating and initializing a session control block for said session object.

12. The system for run-time translation of EHLLAPI function calls to object-oriented host access calls according to claim 7, wherein said session object further comprises a presentation space object and an operator information area object, and wherein said means for performing said method invocations further comprises means for invoking said zero or more determined method invocations on zero or more of said session object, said presentation space object, and said operator information area object.

13. A method for run-time translation of Emulator High Level Language Application Programming Interface (EHLLAPI) function calls to object-oriented host access calls in a computing environment having a connection to a network, comprising the steps of:
    creating a session object for a host-connected session to be used for an EHLLAPI application;
    receiving an EHLLAPI function call from said application;
    determining a sub-function requested by said function call;
    determining zero or more method invocations corresponding to said sub-function;
    performing said method invocations; and
    returning a single result of said method invocations to said application.

14. The method for run-time translation of EHLLAPI function calls to object-oriented host access calls according to claim 13, wherein said EHLLAPI application uses a sequential procedural model, and further comprising steps for converting said sequential procedural model to an event-driven object-oriented model used by said object-oriented host access calls.

15. The method for run-time translation of EHLLAPI function calls to object-oriented host access calls according to claim 14, wherein said object-oriented host access calls are those defined in a Host Access Class Library (HACL) specification.

16. The method for run-time translation of EHLLAPI function calls to object-oriented host access calls according to claim 14, wherein said object-oriented host access calls are those defined in an Open Host Interface Object (OHIO) specification.

17. The method for run-time translation of EHLLAPI function calls to object-oriented host access calls according to claim 14, further comprising the steps of:
  creating and initializing a program control block for said application; and
  creating and initializing a session control block for said session object.

18. The method for run-time translation of EHLLAPI function calls to object-oriented host access calls according to claim 14, wherein said session object further comprises a presentation space object and an operator information area object, and wherein said step of performing said method invocations further comprises steps for invoking said zero or more determined method invocations on zero or more of said session object, said presentation space object, and said operator information area object.

* * * * *